(12) United States Patent
Shishikura

(10) Patent No.: US 10,949,324 B2
(45) Date of Patent: Mar. 16, 2021

(54) SYSTEM FOR AUDITING SHREDDING DATA

(71) Applicants: KABUSHIKI KAISHA TOSHIBA, Minato-ku (JP); Toshiba Infrastructure Systems & Solutions Corporation, Kawasaki (JP)

(72) Inventor: Masahiro Shishikura, Nakano (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 229 days.

(21) Appl. No.: 16/123,850

(22) Filed: Sep. 6, 2018

(65) Prior Publication Data

US 2020/0050531 A1    Feb. 13, 2020

(30) Foreign Application Priority Data

Aug. 8, 2018   (JP) .................................. 2018-149531

(51) Int. Cl.
| | |
|---|---|
| *H04N 1/00* | (2006.01) |
| *G06F 11/34* | (2006.01) |
| *G06F 21/62* | (2013.01) |
| *H04N 1/44* | (2006.01) |
| *G06F 3/12* | (2006.01) |

(52) U.S. Cl.
CPC ........ *G06F 11/3476* (2013.01); *G06F 3/1294* (2013.01); *G06F 21/62* (2013.01); *H04N 1/00644* (2013.01); *H04N 1/4473* (2013.01)

(58) Field of Classification Search
CPC . H04N 1/00644; H04N 1/4473; G06F 3/1294
See application file for complete search history.

(56) References Cited

U.S. PATENT DOCUMENTS

| | | | |
|---|---|---|---|
| 2003/0033538 A1 | 2/2003 | Shishikura | |
| 2006/0157317 A1* | 7/2006 | Shishikura | ................ G07F 7/08 194/207 |
| 2007/0016797 A1 | 1/2007 | Shishikura | |

FOREIGN PATENT DOCUMENTS

| | | |
|---|---|---|
| JP | 2003-58928 | 2/2003 |
| JP | 2006-201954 | 8/2006 |
| JP | 2007-25986 | 2/2007 |
| JP | 2007-252980 | 10/2007 |
| JP | 2009-245214 | 10/2009 |
| JP | 4810098 | 11/2011 |

(Continued)

*Primary Examiner* — Grace Park
(74) *Attorney, Agent, or Firm* — Oblon, McClelland, Maier & Neustadt, L.L.P.

(57) ABSTRACT

According to one embodiment, there is provided a method for auditing shredding data including first count information in a system for auditing shredding data. The audit method includes causing a paper sheet processing apparatus to generate a first MAC based on the first count information using a first MAC generation key, causing the paper sheet processing apparatus to transmit the first count information and the first MAC to a first computing unit, causing the first computing unit to obtain second count information based on the first MAC using a second MAC generation key, causing the first computing unit to compare the first count information and the second count information, and determining an audit result.

14 Claims, 11 Drawing Sheets

(56) References Cited

FOREIGN PATENT DOCUMENTS

| | | |
|---|---|---|
| JP | 2012-38346 | 2/2012 |
| JP | 2014-6931 | 1/2014 |
| JP | 2015-97105 | 5/2015 |
| JP | 2016-122448 | 7/2016 |

* cited by examiner

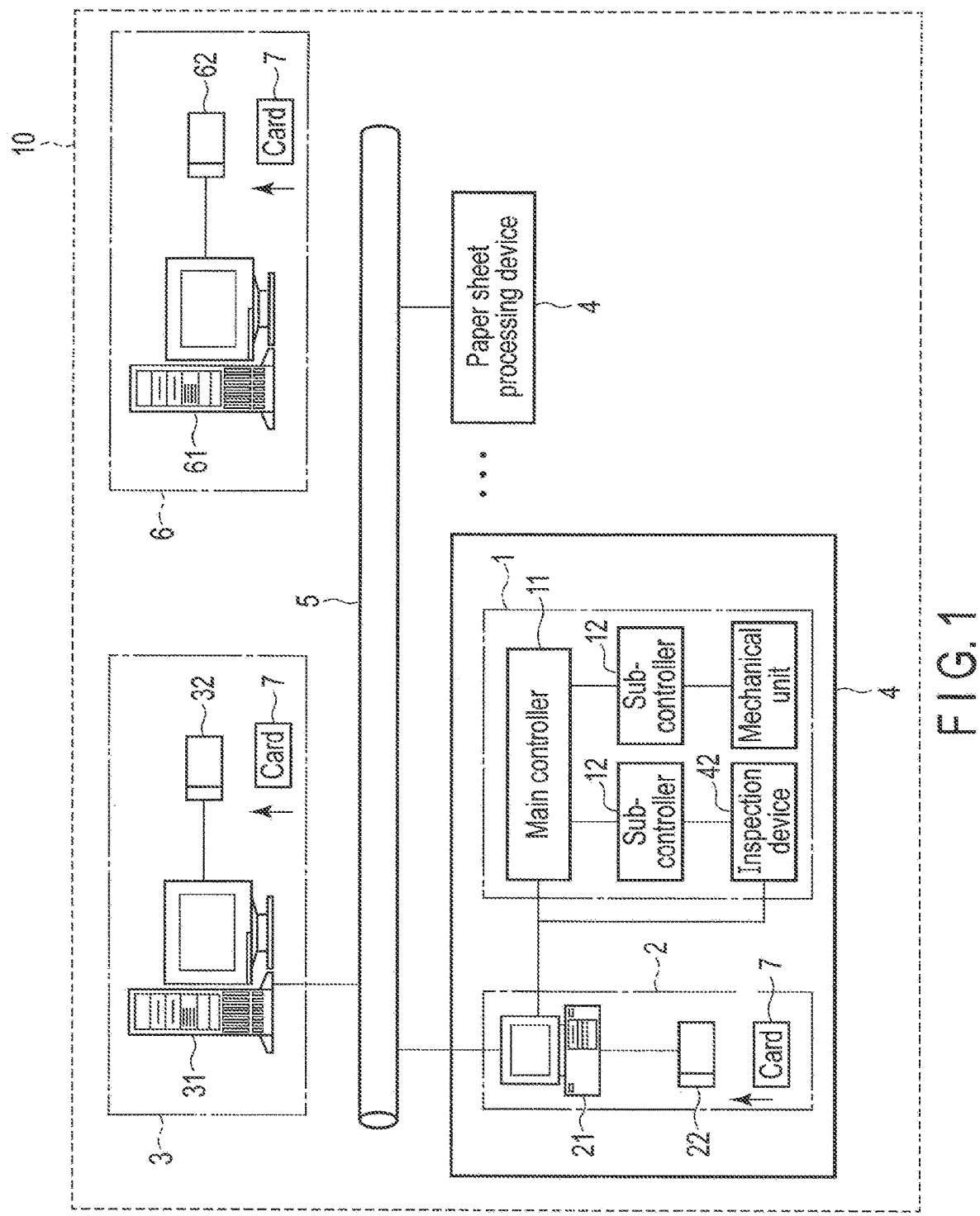
F I G. 1

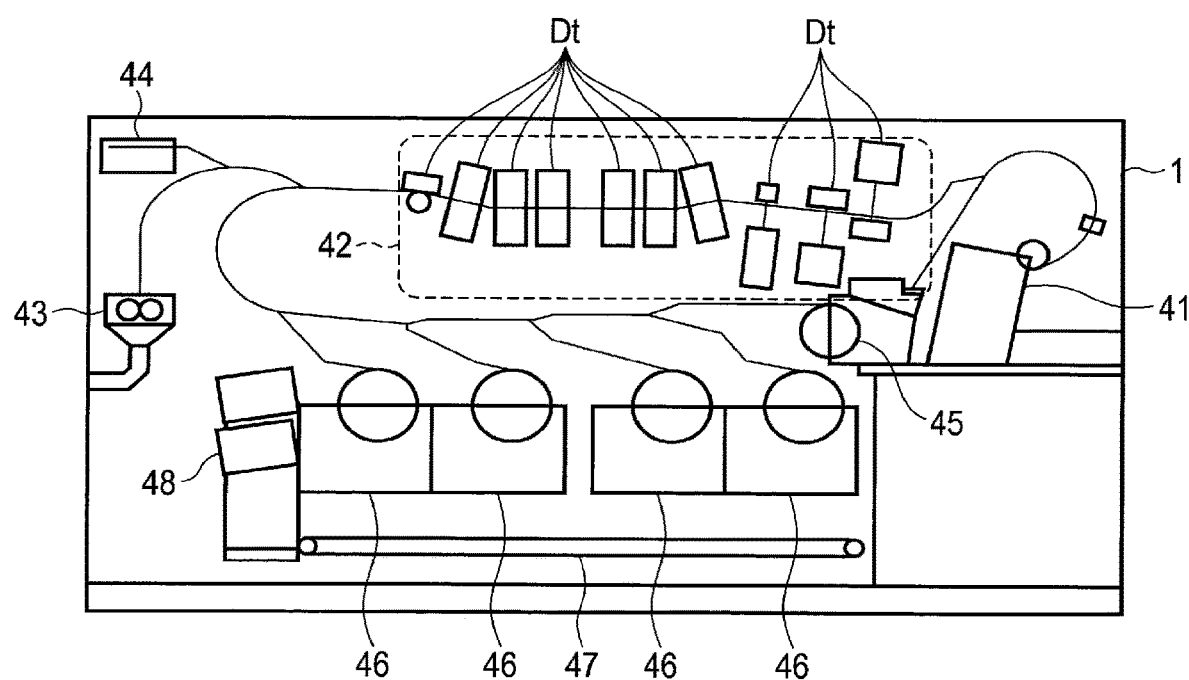
F I G. 2

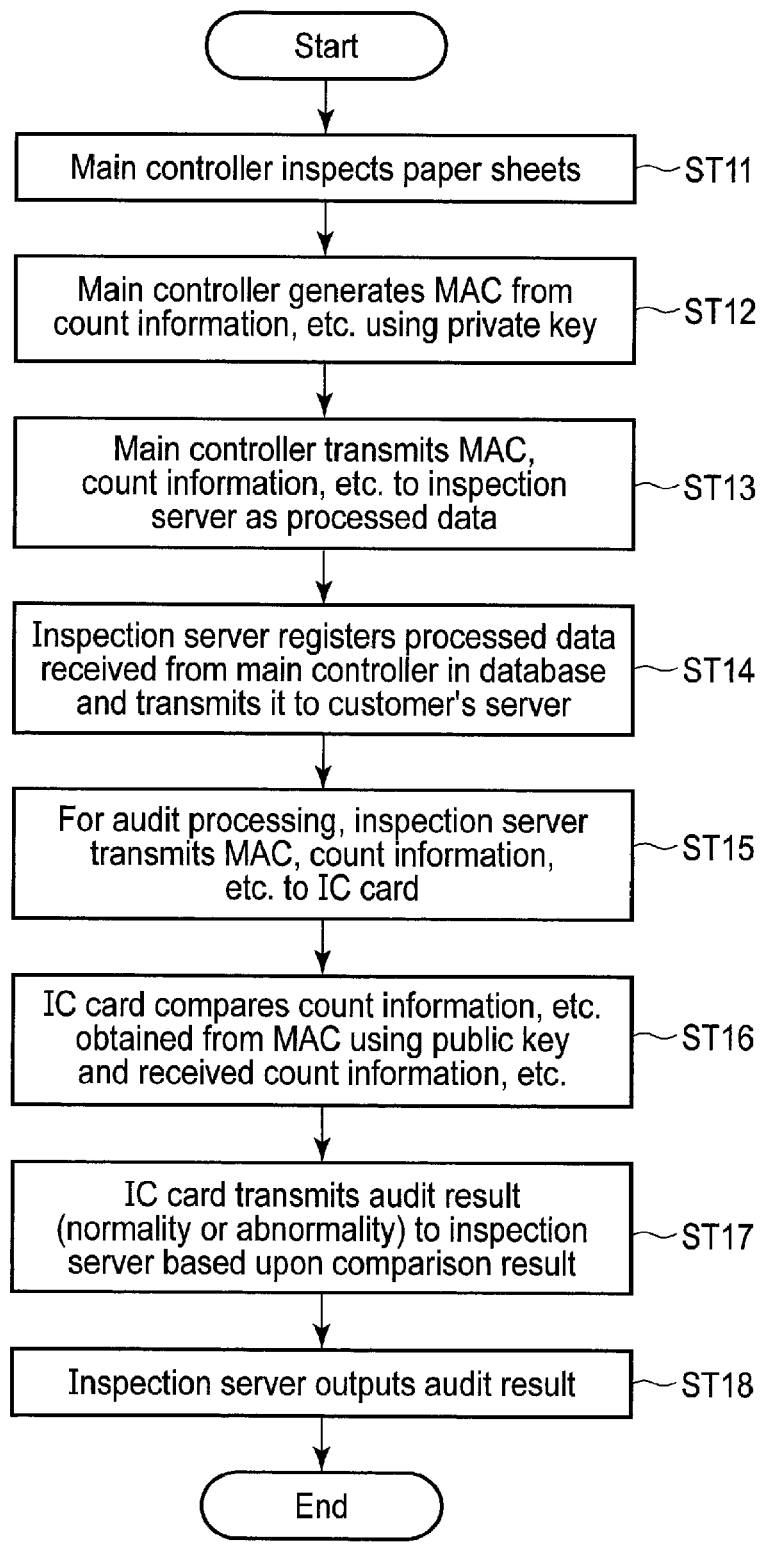
F I G. 3

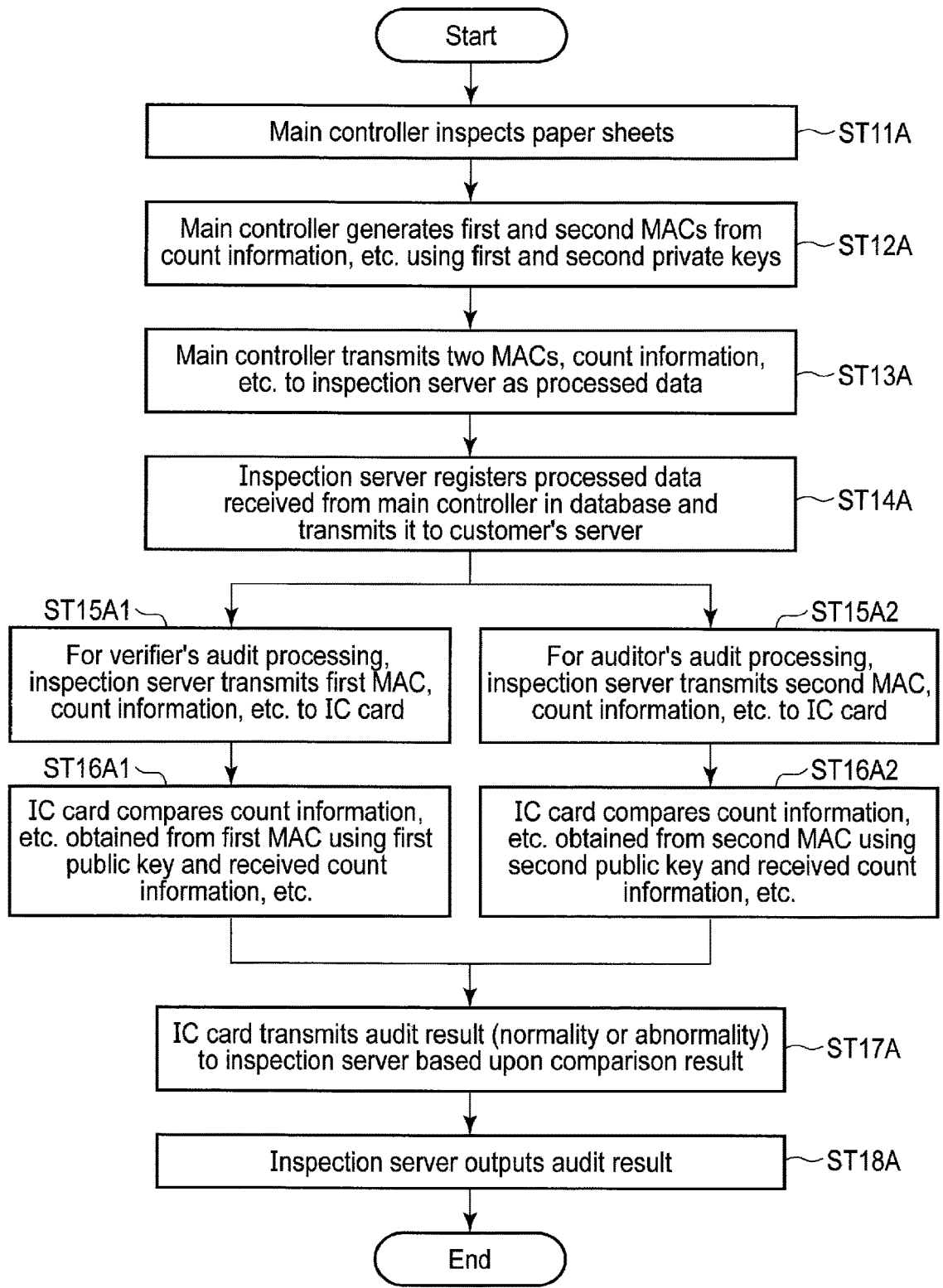
F I G. 7

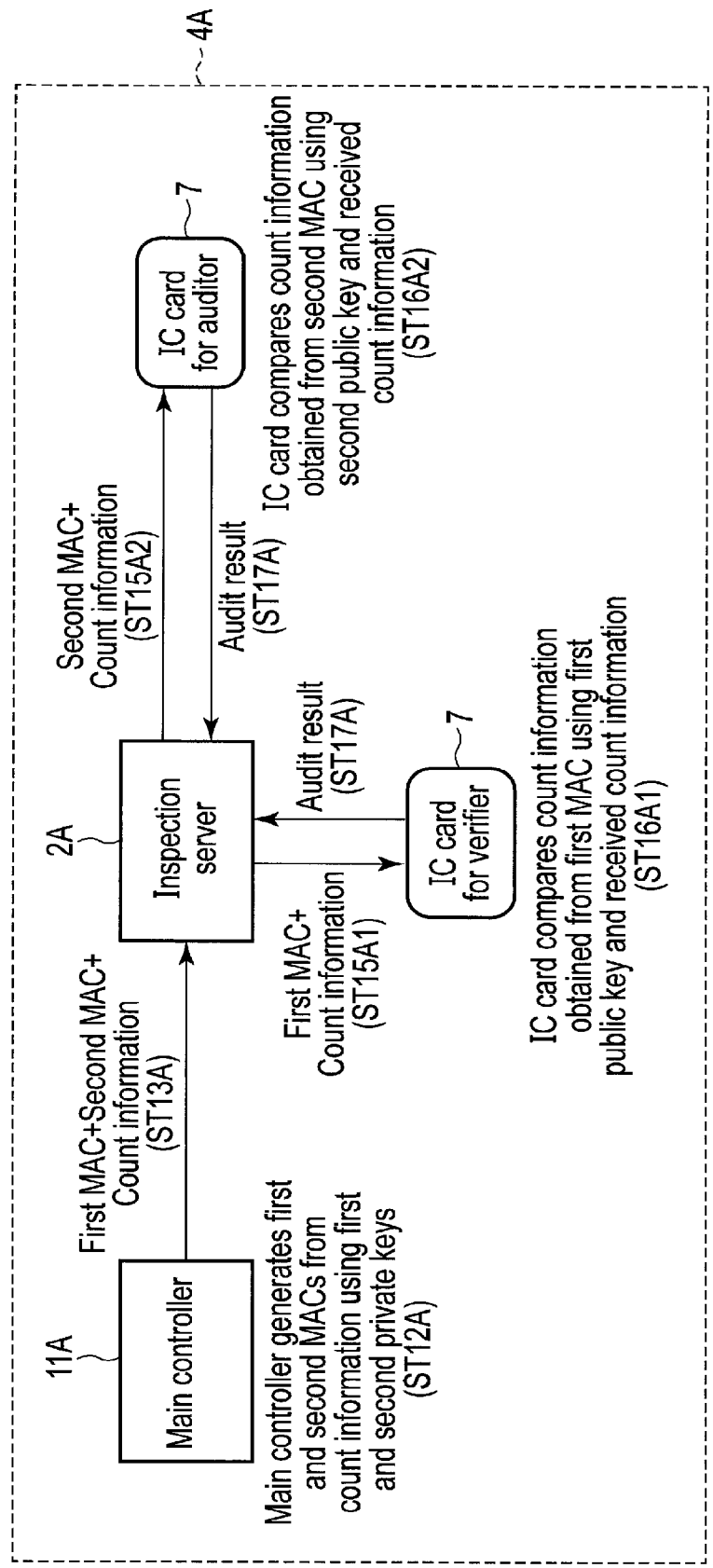
F I G. 8

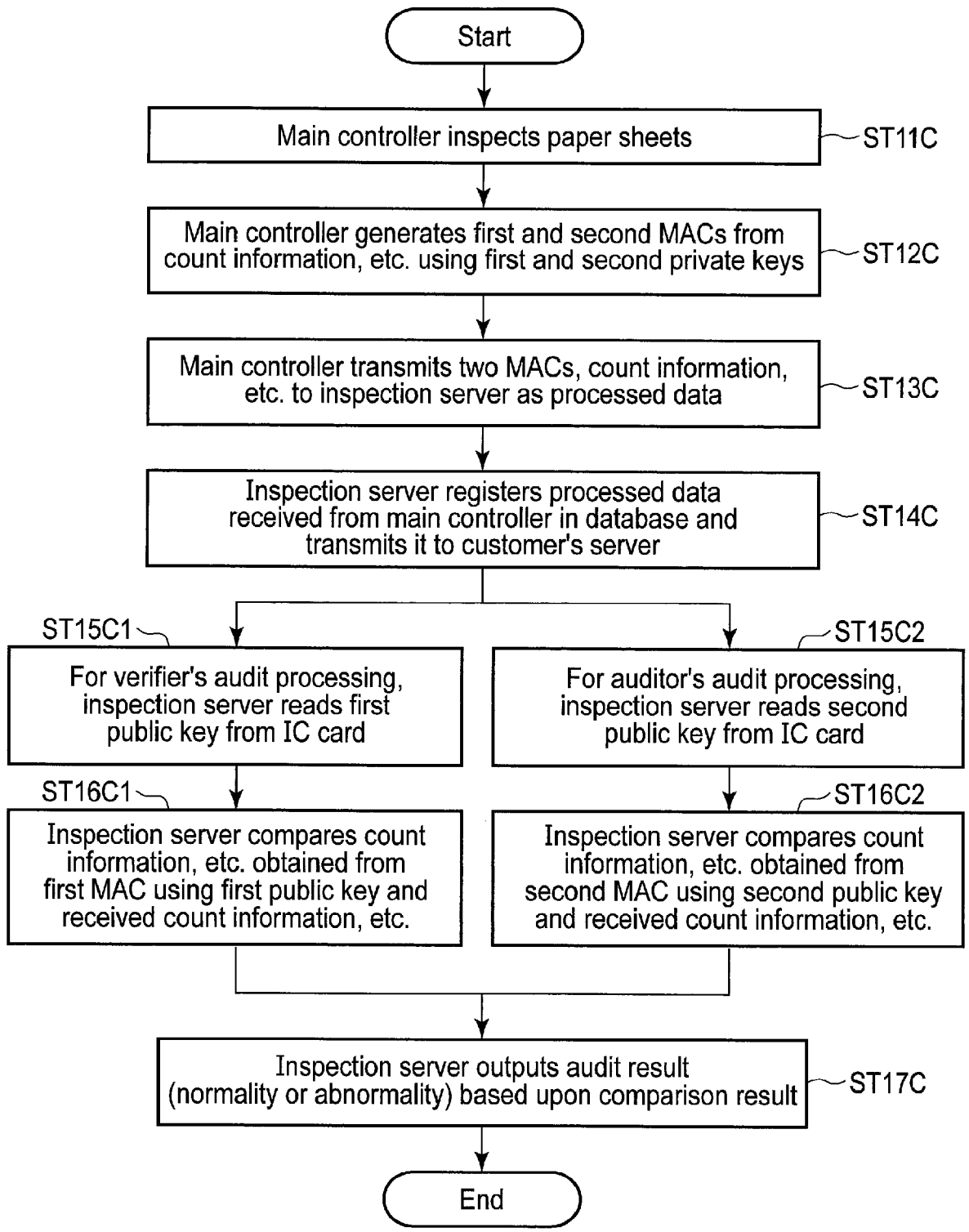
F I G. 11

SYSTEM FOR AUDITING SHREDDING DATA

CROSS-REFERENCE TO RELATED APPLICATIONS

This application is based upon and claims the benefit of priority from Japanese Patent Application No. 2018-149531, filed Aug. 8, 2018, the entire contents of which are incorporated herein by reference.

FIELD

Embodiments described herein relate generally to a system for auditing shredding data.

BACKGROUND

A paper sheet processing device that generally sorts paper sheets such as bills and processes the sorted paper sheets such as binding and shredding them using a computer is disclosed. A paper sheet processing device in which a message authentication code (MAC) prevents count information such as the number of paper sheets to be shredded from being falsified is also disclosed.

However, a higher level of security is required to prevent processed data such as count information from being falsified.

Embodiments described herein aim to provide an audit method for paper sheet processed data with improved security against falsification of processed data of paper sheets.

BRIEF DESCRIPTION OF THE DRAWINGS

FIG. 1 is a block diagram showing a configuration of a paper sheet processing system according to a first embodiment.

FIG. 2 is a configuration diagram showing an example of a paper sheet processing device according to the first embodiment configured as a bill processor.

FIG. 3 is a flowchart showing a procedure for audit processing of count information in the paper sheet processing device according to the first embodiment.

FIG. 7 is a flowchart showing a procedure for audit processing of count information in a paper sheet processing device according to a second embodiment.

FIG. 8 is a schematic block diagram showing a flow of information about the audit processing of count information in the paper sheet processing device according to the second embodiment.

FIG. 11 is a flowchart showing a procedure for audit processing of count information in a paper sheet processing device according to a fourth embodiment.

DETAILED DESCRIPTION

Figure 4:
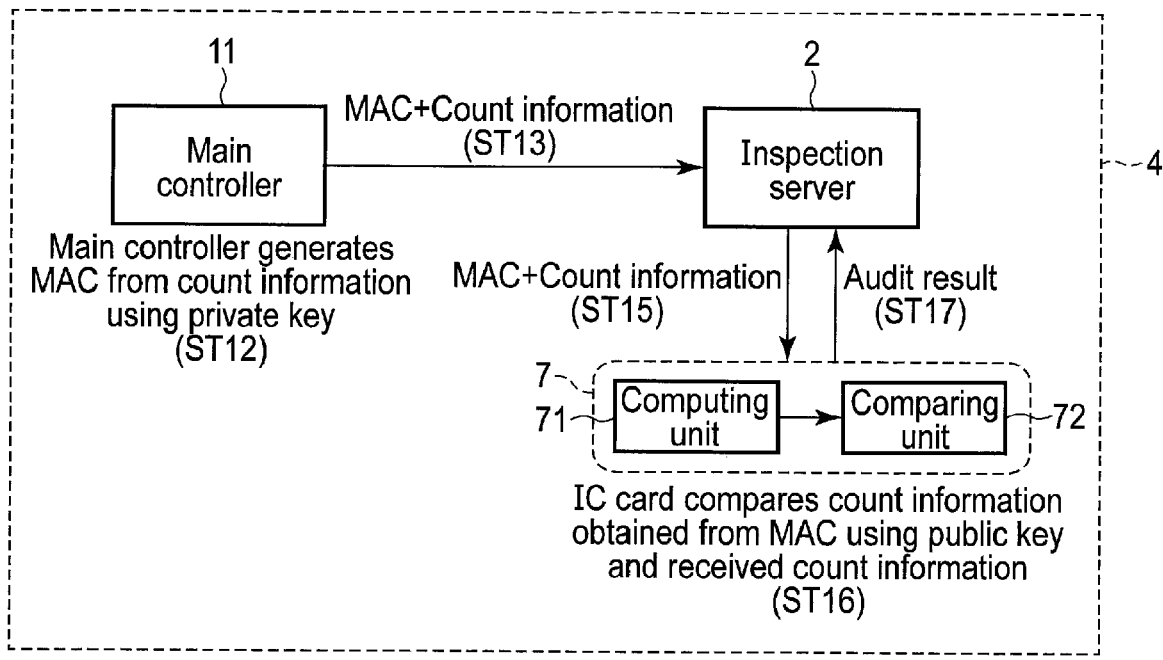
FIG. 4 is a schematic block diagram showing a flow of information about the audit processing of count information in the paper sheet processing device according to the first embodiment.

In general, according to one embodiment, there is provided a method for auditing shredding data including first count information which includes the number of processed paper sheets in a system for auditing shredding data, including a paper sheet processing apparatus which inspects paper sheets and classifies the paper sheets based on a result of inspection of the paper sheets. The audit method includes causing the paper sheet processing apparatus to generate a first MAC based on the first count information using a first MAC generation key; causing the paper sheet processing apparatus to transmit the first count information and the first MAC to a first computing unit which performs arithmetic computation for an audit; causing the first computing unit to obtain second count information based on the first MAC using a second MAC generation key stored in a first IC card and paired with the first MAC generation key; causing the first computing unit to compare the first count information and the second count information; and determining an audit result as normality when the first count information and the second count information compared by the first computing unit coincide with each other, and determining the audit result as abnormality when the first count information and the second count information compared by the first computing unit do not coincide with each other.

First Embodiment

FIG. 1 is a block diagram showing a configuration of a paper sheet processing system 10 according to a first embodiment. In the specification and drawings of this application, like elements are denoted by like reference numerals or signs, and their detailed descriptions may be omitted or simplified.

The paper sheet processing system 10 is, for example, an inspection device for foreign financial institutions. Here, the paper sheets will be described chiefly as bills, but may be securities and the like.

The paper sheet processing system 10 includes a customer's server 3, a plurality of paper sheet processing devices 4, a key generation server 6 and an IC card 7. The number of paper sheet processing devices 4 has only to be at least one. The customer's server 3 and paper sheet processing devices 4 are connected via a network 5. The network 5 is a local area network (LAN), a wide area network (WAN) or the like. The key generation server 6 is not connected to the network 5.

The paper sheet processing devices 4 (for example, type FS810) each include a device body 1 and an inspection server 2. The device body 1 and inspection server 2 are connected through an information transmission channel such as a universal serial bus (USB) cable or the like.

The device body 1 comprises mechanical units including an inspection device 42, sub-controllers 12 which control operations of the corresponding mechanical units, and a main controller 11 which comprehensively controls the device body 1 and the sub-controllers 12. A computer to perform arithmetic computations is employed as the main controller 11. The main controller 11 is connected to each of the sub-controllers 12 and the inspection device 42 by a transmission path (for example, bus).

As explained below, the device body 1 conveys the supplied paper sheets one by one for inspection executed by the inspection device 42. The inspection includes authenticity determination and soundness determination. The authenticity determination is to determine whether a paper sheet is authentic (genuine bill) or counterfeit (counterfeit bill). If the paper sheet is a genuine bill, the soundness determination is performed. The soundness determination is to determine whether the genuine bill is a correct bill that can be recirculated or a damaged bill that cannot be recirculated due to damage and the like. Based upon a result of the inspection, the device body 1 classifies the paper sheets into counterfeit bills, correct bills and damaged bills. The device body 1 processes the paper sheets for each classification of the bills. For example, the paper sheets of correct bills are collected and bound, and the paper sheets of damaged bills are shredded. The device body 1 supplies the inspection server 2 with processing results including the number of paper sheets for each classification of the bills as processed data. The main controller 11 includes a memory (not shown) storing a MAC generation key which generates MAC to be explained below.

The inspection server 2 includes a server body 21 and an integrated circuit (IC) card reader/writer 22. The server body 21 is configured by a storage unit in which a database is constructed, an arithmetic computation unit of the computer, and the like. The IC card reader/writer 22 is connected to the server body 21 via a USB cable or the like.

The inspection server 2 operates the device body 1 by giving an instruction about an operating mode, monitors the operating conditions of the device body 1, totalizes the processed data output from the device body 1, and prints a result of the totalization. For example, the inspection server 2 registers the processing results received from the device body 1 as processed data in the database. Based upon the processed data registered in the database, the inspection server 2 manages the processing results of the received paper sheets. The inspection server 2 also controls the IC card reader/writer 22. The IC card reader/writer 22 thus executes writing data to or reading data from the IC card 7, under control of the inspection server 2.

The customer's server 3 includes a server body 31 and an IC card reader/writer 32. The server body 31 is configured by a storage unit in which a database is constructed, an arithmetic computation unit of the computer, and the like. The IC card reader/writer 32 is connected to the server body 31 via a USE cable or the like. The customer's server 3 is connected to the inspection server 2 of each of the paper sheet processing devices 4 via the network 5. The customer's server 3 receives the processed data from each of the paper sheet processing devices 4 to perform arithmetic computations such as totalization. The customer's server 3 also controls the IC card reader/writer 32. The IC card reader/reader 32 thus executes writing data to or reading data from the IC card 7, under control of the customer's server 3.

The customer's server 3 has basically the same function as that of the inspection server 2 of each of the paper sheet processing devices 4 and receives all necessary information such as processed data from the inspection server 2. Thus, an operator may perform all operations on the customer's server 3 instead of performing an operation (e.g. management or audit of processed data) on the inspection server 2.

The key generation server 6 includes a server body 61 and an IC card reader/writer 62. The server body 61 is configured by a storage unit, an arithmetic computation unit of the computer, and the like. The IC card reader/writer 62 is connected to the server body 61 via a USB cable or the like. The key generation server 6 also controls the IC card reader/writer 62. The IC card reader/writer 62 thus executes writing data to or reading data from the IC card 7, under control of the key generation server 6.

The key generation server 6 is a device to instruct the IC card 7 to generate a new MAC generation key. Upon receiving an instruction from the key generation server 6, the IC card 7 generates a new MAC generation key based upon the key generation function implemented therein. The IC card 7 thus updates the MAC generation key stored therein.

The MAC generation keys stored in the IC card 7 and the main controller 11 of the device body 1 are a pair of MAC generation keys that are different from each other. As these paired MAC generation keys, a private key and a public key used generally for encryption can be used.

When the IC card 7 in which the MAC generation key is updated is inserted into the IC card reader/writer 22 of the inspection server 2, the MAC generation key stored in the main controller 11 is updated to correspond to the MAC generation key stored in the IC card 7. Information transmitted between the IC card 7 and the main controller 11 is encrypted. The IC card 7 and the main controller 11 can be provided with a transmission encryption key used for the information transmission. Thus, the inspection server 2 interposed between the IC card 7 and the main controller 11 does not store information about a pair of MAC generation keys that has been updated, if the keys are not encrypted even temporarily. As the transmission encryption key, a private key and a public key used generally for encryption can be used.

FIG. 2 is a cross-sectional view schematically showing a configuration example of the paper sheet processing device 4 according to the first embodiment as one of the mechanical units of the device body 1.

The device body 1 includes a bill supply unit 41, an inspection device 42, a shredder 43, an audit stacker 44, an elimination unit 45, a plurality of collection binding units 46, a conveyor 47, an output stacker 48, and a conveyance mechanism (conveyor belts and rollers) conveying paper sheets as the mechanical units.

The bill supply unit 41 removes the bills (paper sheets) one by one from the device body 1 and conveys them to the inspection device 42.

The inspection device 42 includes various detectors Dt such as a camera, an optical sensor and a magnetic sensor arranged along a conveyance channel. The inspection device 42 detects a denomination, a shape, a thickness, a magnetic component, sides, authenticity, a damage, two superposing sheets, etc., of the conveyed bills (paper sheets) by the detectors Dt. The inspection device 42 transmits the detection results to the main controller 11 via the sub-controller 12. The detection results are used to classify the bills supplied from the bill supply unit 41. Specifically, denominations of the bills are determined and also genuine bills, counterfeit bills, correct bills, damaged bills, etc., are determined. Bills determined as correct bills are classified in types and conveyed to the corresponding collection binding units 46. Bills determined as damaged bills are conveyed to the shredder 43 or the audit stacker 44.

The shredder 43 rejects (shreds) the damaged bills such that they cannot be recirculated. The number of shredded damaged bills is managed as count information by the paper sheet processing device 4 and the like.

The audit stacker 44 receives a preset percentage of bills determined as damaged bills. The preset percentage may be several percent or smaller than one percent. The damaged bills stacked in the audit stacker 44 are used to confirm, e.g. damaged conditions of the damaged bills. For example, an operator takes a damaged bill out of the audit stacker 44 and confirms a damaged condition of the damaged bill. The operator can thus confirm whether the paper sheet processing device 4 properly determines the damaged bills. Note that the audit stacker 44 need not be provided.

When the received bills cannot be detected correctly or caught mechanically correctly, the elimination unit 45 ejects the bills.

The collection binding units 46 are provided for their respective denominations. The collection binding units 46 receive correct bills of their respective denominations. Each of the collection binding units 46 collects the conveyed correct bills, and bundles and binds a given number of correct bills with a band. The bound and bundled bills are conveyed to the output stacker 48 through the conveyor 47.

The output stacker 48 stocks the bundled bills and outputs them when necessary such that the operator can take them out.

Control to be performed by the device body 1 will be described with reference to FIGS. 1 and 2.

The main controller 11 performs general control in the paper sheet processing device 4. Based on instructions from the main controller 11, the sub-controller 12 causes the mechanical units (the bill supply unit 41, inspection device 42, shredder 43, audit stacker 44, elimination unit 45, collection binding units 46, conveyor 47, output stacker 48, etc.) to perform a predetermined operation. The sub-controller 12 may be composed of controllers or may comprise a lower-order controller.

For example, the main controller 11 instructs the inspection device 42 to perform the inspection operation via the sub-controller 12. The inspection device 42 inspects the paper sheets, based on the instructions from the main controller 11 and the sub-controller 12. The inspection device 42 outputs inspection data to be used for inspection to the main controller 11, based on a detection result from each detector Dt. The main controller 11 outputs processed data indicative of processing results including count information of the paper sheets, to the inspection server 2, based on the inspection result received from the inspection device 42.

FIG. 3 is a flowchart showing a procedure for audit processing of count information in the paper sheet processing device 4 according to the first embodiment. FIG. 4 is a schematic block diagram showing a flow of information about the audit processing of count information in the paper sheet processing device 4 according to the first embodiment.

The processed data transmitted and received between the main controller 11 and the IC card 7 is encrypted using a pair of MAC generation keys that differ from each other. In the following descriptions, the main controller 11 stores a private key in its internal memory or the like as an MAC generation key, and the IC card 7 stores a public key in its internal memory or the like as an MAC generation key; however, the private key can be stored in the IC card 7 and the public key can be stored in the main controller 11.

First, the main controller 11 inspects paper sheets (bills) (step ST11). The main controller 11 processes the paper sheets based upon a result of the inspection. For example, the main controller 11 causes the collection binding units 46 of the device body 1 to collect and bind paper sheets determined as correct bills. The main controller 11 causes the shredder 43 to shred paper sheets determined as damaged bills.

The main controller 11 creates count information based upon a result of the processing and generates an MAC from the count information and other information using a private key (step ST12). The count information includes at least the number of paper sheets that have been shredded (the total number of shredded paper sheets). In this embodiment, the total number of shredded paper sheets is not the number of shredded paper sheets for each batch but the number of shredded paper sheets for each business operation (e.g. per day). The total number of shredded paper sheets is a target to be audited. To generate an MAC, in addition to the count information, information such as a cumulative amount of count information, date, time and count values is used. Note that whatever information other than the count information can be used to generate an MAC, but unique information (date, time, serial numbers, combinations of these, etc.) is desirable to do so. When the count information and the unique information are combined, if the count information is falsified, an MAC corresponding to the falsified count information becomes more difficult to generate than an MAC to be generated by the count information only.

The main controller 11 transmits the generated MAC, count information and other information (count information, etc.) used to generate the MAC to the inspection server 2 as processed data (step ST13). The inspection server 2 registers the processed data received from the main controller 11 in the database and transmits it to the customer's server 3 (step ST14).

For audit, the inspection server 2 transmits the MAC, count information, etc., to the IC card 7 inserted into the IC card reader/writer 22 (step ST15).

The IC card 7 causes a computing unit 71 to perform arithmetic computation to obtain count information, etc., from the MAC received from the inspection server 2, using a public key. The IC card 7 causes a comparing unit 72 to compare the count information, etc., obtained from the MAC by the computing unit 71 and the count information, etc., received in unencrypted state from the inspection server 2 (step ST16).

Based upon a result of the comparison, the IC card 7 transmits a result of the audit to the inspection server 2. When the compared information items coincide with each other, the IC card 7 sends "Yes" indicating that the audit result is normal. When they do not coincide, the IC card 7 sends "No" indicating that the audit result is abnormal (step ST17). Note that the audit result can be displayed on the IC card 7.

The inspection server 2 outputs the audit result (step ST18). The audit result can be displayed on a display, printed by a printer, or output in whatever manner.

It has been described that the inspection server 2 performs audit processing. The customer's server 3 is also configured to perform the audit processing.

Figure 5:
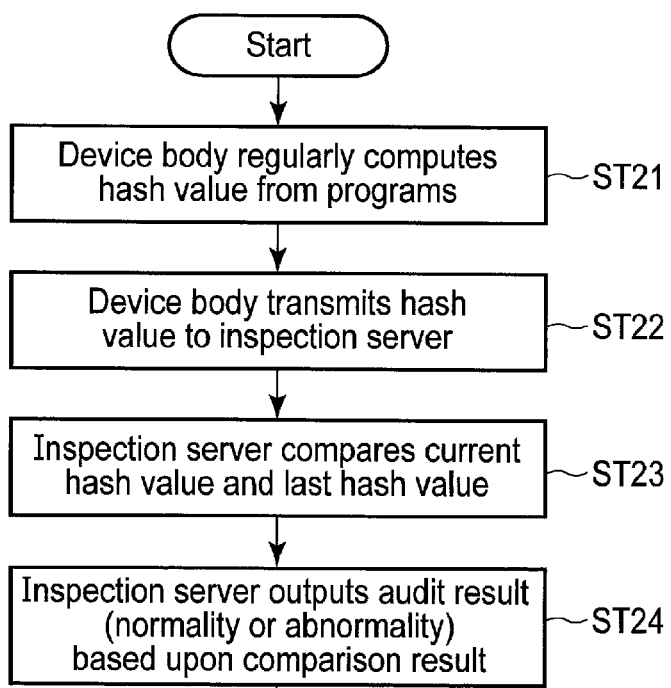
FIG. 5 is a flowchart showing a procedure for audit processing of programs implemented in a device body in the paper sheet processing system according to the first embodiment.

FIG. 5 is a flowchart showing a procedure for audit processing of programs implemented in the device body 1 in the paper sheet processing system 10 according to the first embodiment.

Programs to be audited are programs to cause a computer to achieve the function of the device body 1. For example, programs to be audited may be all programs in the device body 1, only the program corresponding to the main controller 11, or some of the programs (e.g. programs related to the processed data).

The device body 1 regularly computes a hash value from the programs using a hash function stored therein (step ST21). For example, the device body 1 computes a hash value each time it is powered up.

The device body 1 transmits the computed hash value to the inspection server 2 (step ST22).

The inspection server 2 compares the current hash value received from the device body 1 and the last received hash value (step ST23).

The inspection server 2 outputs a result of the audit based upon a result of the comparison. When the compared values coincide with each other, the inspection server 2 outputs "Yes" indicating that the audit result is normal. When they do not coincide, the inspection server 2 outputs "No" indicating that the audit result is abnormal (step ST24).

As the hash function, a private key for audit processing of count information can be used, and an MAC can be computed in place of the hash value. Furthermore, the inspection server 2 may only output hash values without comparing them. Audit based on the comparison can be made by a device other than the inspection server 2 or by human eyes.

According to the first embodiment, count information (e.g. the total number of shredded bills and the number of damaged bills) can be prevented from being falsified by computing an MAC as well as the count information using a pair of MAC generation keys that differ from each other.

Furthermore, the MAC generation keys stored in the IC card 7 and the device body 1 are different and like the relationship between a private key and a public key used for encryption, one of the MAC generation keys is difficult to infer from the other. Therefore, even though the IC card 7 is stolen and the count information is falsified, an MAC including the falsified count information cannot be obtained because the MAC generation key stored in the device body 1 cannot be found. Security against falsification of count information can thus be improved.

Security against falsification of count information can be improved further by managing hash values regularly from the programs to achieve the function.

Figure 6:
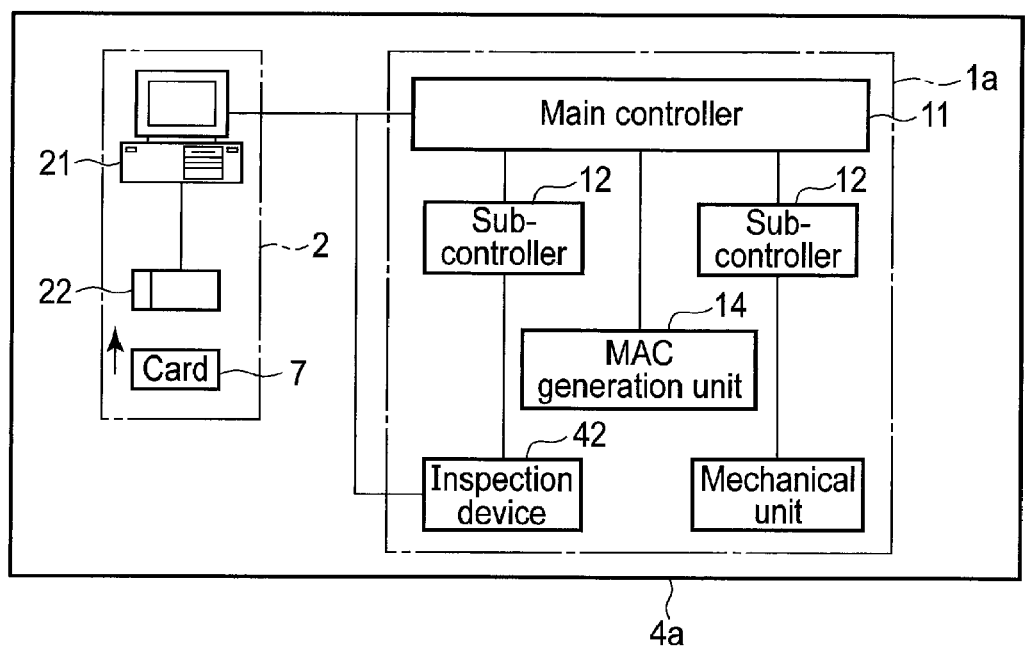
FIG. 6 is a block diagram showing a configuration of a paper sheet processing device according to a modification to the first embodiment.

As a modification to the first embodiment, in a paper sheet processing device 4a, an MAC generation unit 14 can be provided in a main body 1a to generate an MAC instead of the main controller 11, as shown in FIG. 6.

The MAC generation unit 14 is an arithmetic computation unit to compute an MAC. For example, the MAC generation unit 14 is a dedicated board specializing in MAC computation. The MAC generation unit 14 is connected to the main controller 11 via a transmission channel (e.g. a bus).

The MAC generation unit 14 thus makes it possible to shorten the MAC computing time.

Second Embodiment

FIG. 7 is a flowchart showing a procedure for audit processing of count information in a paper sheet processing device 4A according to a second embodiment. FIG. 8 is a schematic block diagram showing a flow of information about the audit processing of count information in the paper sheet processing device 4A according to the second embodiment.

A main controller 11A and an inspection server 2A in the paper sheet processing device 4A according to the second embodiment are similar to the main controller 11 and the inspection server 2 in the paper sheet processing device 4 according to the first embodiment, except for audit processing. Hereinafter, points different from those of the first embodiment will mainly be described.

Assume here that count information is audited by two persons. One is a verifier who conducts audit every day, and the other is, e.g. a verifier's boss, or an auditor who conducts audit every six months.

The processed data transmitted and received between the main controller 11A and IC cards 7 is encrypted using two pairs of MAC generation keys that differ from each other.

The main controller 11A stores one of each of the two pairs of MAC generation keys. Assume here that two MAC generation keys stored in the main controller 11A are first and second private keys. The IC card 7 used by the verifier stores a first public key paired with the first private key. The IC card 7 used by the auditor stores a second public key paired with the second private key.

Steps ST11A to ST18A of the procedure for audit processing according to the second embodiment shown in FIG. 7 are similar to steps ST11 to ST18 of the procedure for audit processing according to the first embodiment shown in FIG. 3. Hereinafter, points different from the audit processing of the first embodiment will mainly be described.

First, the main controller 11A inspects paper sheets (bills) (step ST11A).

The main controller 11A creates count information such as the number of shredded paper sheets, based upon a result of processing and generates two MACs of a first MAC and a second MAC from the count information using the first and second private keys (step ST12A).

The main controller 11A transmits the generated two MACs, count information and other information (count information, etc.) used to generate the MACs to the inspection server 2A as processed data (step ST13A).

The inspection server 2A registers the processed data received from the main controller 11A in the database and transmits it to the customer's server 3 (step ST14A).

For verifier's audit processing, the inspection server 2A transmits the first MAC, count information, etc., to the verifier's IC card 7 inserted into the IC card reader/writer 22 (step ST15A1).

The verifier's IC card 7 performs arithmetic computation to obtain count information, etc., from the first MAC received from the inspection server 2A, using the first public key. The IC card 7 compares the count information, etc., obtained from the first MAC and the count information, etc., received in unencrypted state from the inspection server 2A (step ST16A1).

Based upon a result of the comparison, the IC card 7 transmits a result of the audit to the inspection server 2A (step ST17A). The inspection server 2A outputs the audit result (step ST18A).

For auditor's audit processing, the inspection server 2A transmits the second MAC, count information, etc., to the auditor's IC card 7 inserted into the IC card reader/writer 22 (step ST15A2).

The auditor's IC card 7 performs arithmetic computation to obtain count information, etc., from the second MAC received from the inspection server 2A, using the second public key. The IC card 7 compares the count information, etc., obtained from the second MAC and the count information, etc., received in unencrypted state from the inspection server 2A (step ST16A2). The subsequent procedure is similar to that of the verifier's audit processing (steps ST17A and ST18A).

It has been described that the inspection server 2A performs audit processing. The customer's server 3 is also configured to perform the audit processing.

According to the second embodiment, the following advantages can be brought about in addition to those of the first embodiment.

Since two MACs as well as count information are obtained using two pairs of MAC generation keys, security against falsification of the count information can be improved more than in the first embodiment.

Specifically, since count information can be audited by two persons such as a verifier and an auditor audit, it can be double-checked. Even though one of the two persons falsifies the count information, the other can find the falsification. It is thus difficult even for a person who manages count information (a verifier, an auditor, etc.) to falsify the count information.

Third Embodiment

Figure 9:
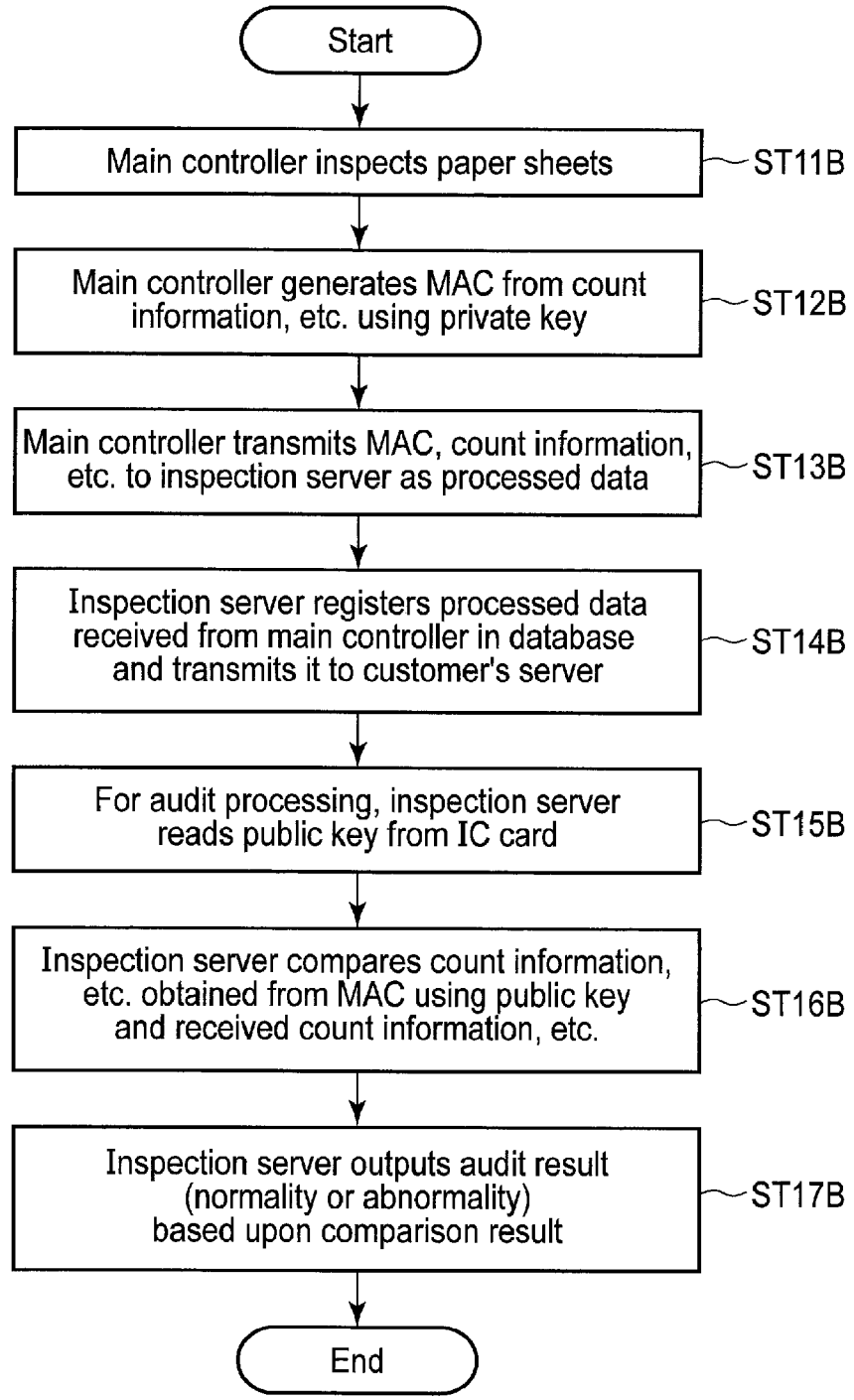
FIG. 9 is a flowchart showing a procedure for audit processing of count information in a paper sheet processing device according to a third embodiment.
Figure 10:
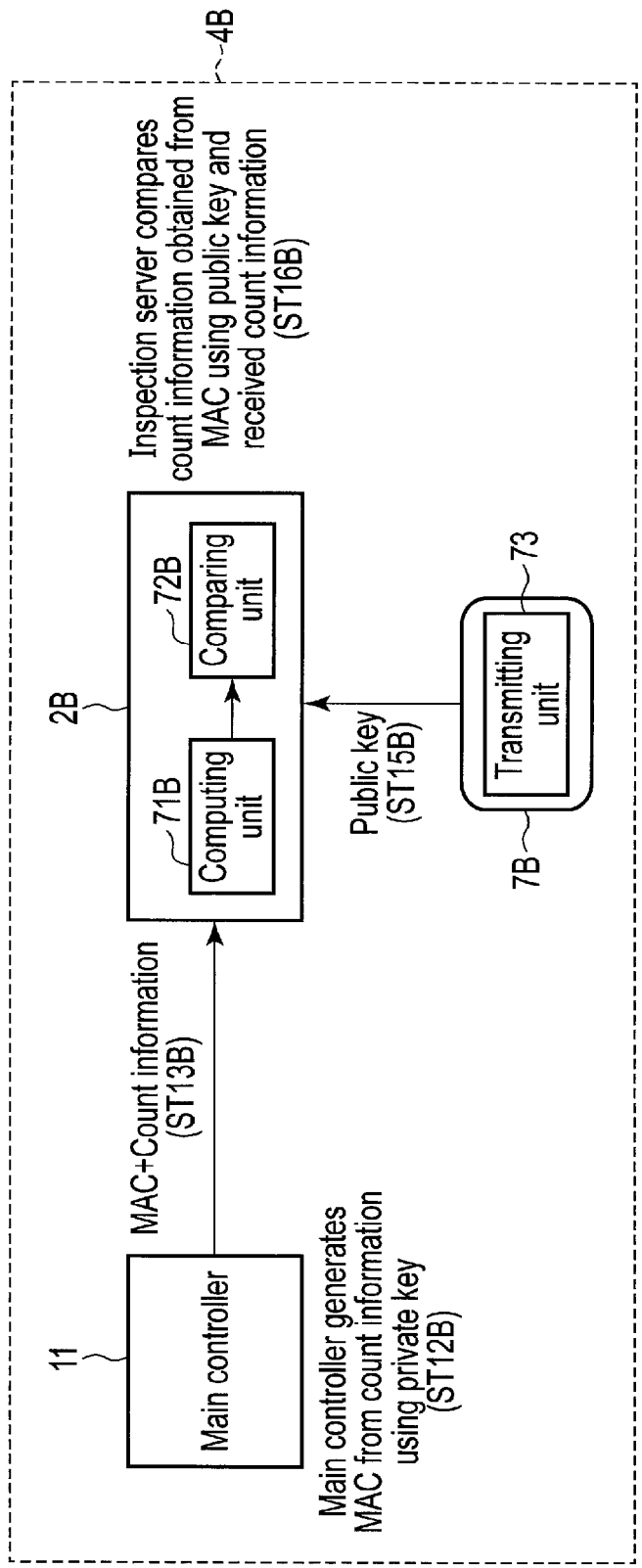
FIG. 10 is a schematic block diagram showing a flow of information about the audit processing of count information in the paper sheet processing device according to the third embodiment.

FIG. 9 is a flowchart showing a procedure for audit processing of count information in a paper sheet processing device 4B according to a third embodiment. FIG. 10 is a schematic block diagram showing a flow of information about the audit processing of count information in the paper sheet processing device 4B according to the third embodiment.

In the paper sheet processing device 4B according to the third embodiment, an inspection server 2B and an IC card 7B are used in place of the inspection server 2 and IC card 7 in the paper sheet processing device 4 according to the first embodiment. Thus, the comparison of count information, etc., for audit processing, which is performed by the IC card 7 in the first embodiment, is performed by the inspection server 2B in the third embodiment. Except for the comparison for audit processing, the third embodiment is similar to the first embodiment.

The inspection server 2B includes a computing unit 71B and a comparing unit 72B whose functions are equal to those of the computing unit 71 and comparing unit 72 of the IC card 7 according to the first embodiment. The IC card 7B excludes the computing unit 71 and comparing unit 72 of the IC card 7 according to the first embodiment and includes a transmitting unit 73 that transmits a public key. As for the other parts, the inspection server 2B and IC card 7B are similar to the inspection server 2 and IC card 7 according to the first embodiment.

Steps ST11B to ST14B of the procedure for audit processing according to the third embodiment shown in FIG. 9 are similar to steps ST11 to ST14 of the procedure for audit processing according to the first embodiment shown in FIG. 3. Accordingly, the procedure for audit processing will be described from step ST15B.

For audit processing, the inspection server 2B reads a public key (MAC generation key) from the IC card 7B (step ST15B). Thus, the transmitting unit 73 of the IC card 7B transmits the public key to the inspection server 2B.

The inspection server 2B causes the computing unit 71B to perform computation to obtain count information, etc., from the MAC received from the main controller 11, using the public key received from the IC card 7B. The inspection server 2B compares the count information, etc., obtained from the MAC by the computing unit 71B and the count information, etc., received in unencrypted state from the main controller 11 (step ST16B).

Based upon a result of the comparison, the inspection server 2B outputs the audit result (step ST17B). When the compared information items coincide with each other, the inspection server 2B outputs the fact that the audit result is normal. When they do not coincide, the inspection server 2B outputs the fact that the audit result is abnormal. The outputs of the audit result are similar to those in step ST18 according to the first embodiment.

It has been described that the inspection server 2B performs audit processing. The customer's server 3 is also configured to perform the audit processing.

According to the third embodiment, since the inspection server 2B computes and compares the count information, etc., in the audit processing, the audit result can be obtained more quickly than that in the first embodiment in addition to the advantage of the first embodiment.

Fourth Embodiment

Figure 12:
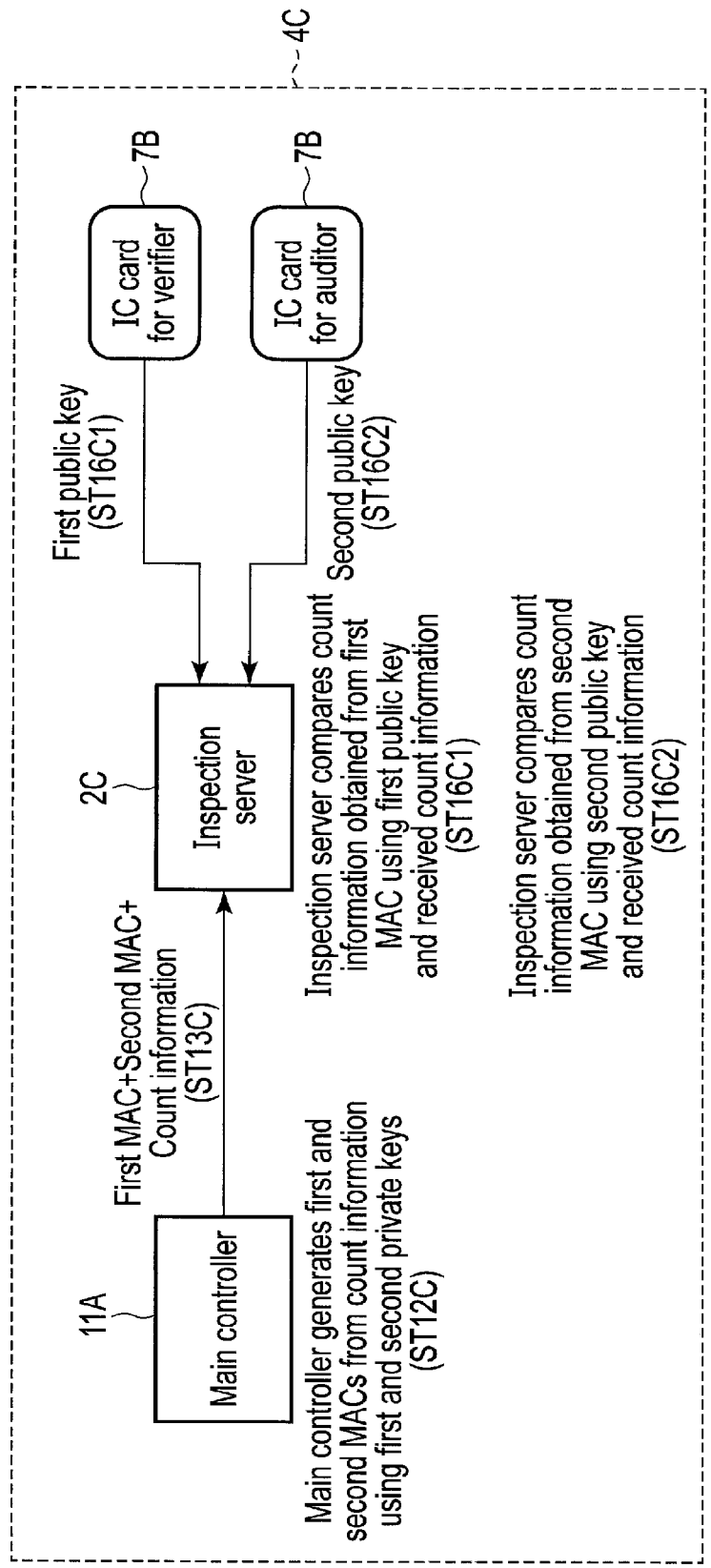
FIG. 12 is a schematic block diagram showing a flow of information about the audit processing of count information in the paper sheet processing device according to the fourth embodiment.

FIG. 11 is a flowchart showing a procedure for audit processing of count information in a paper sheet processing device 4C according to a fourth embodiment. FIG. 12 is a schematic block diagram showing a flow of information about the audit processing of count information in the paper sheet processing device 4C according to the fourth embodiment.

In the paper sheet processing device 4C according to the fourth embodiment, the main controller 11A according to the second embodiment is used in place of the main controller 11 in the paper sheet processing device 4B according to the third embodiment, and an inspection server 2C is used in place of the inspection server 2B in the paper sheet processing device 4B according to the third embodiment. Thus, like in the third embodiment, the comparison of count information, etc., for audit processing is performed by the inspection server 2C, and like in the second embodiment, audit can be conducted by two persons (e.g. a verifier and an auditor). Except for the comparison for audit processing, the fourth embodiment is similar to the third embodiment.

In the inspection server 2B according to the third embodiment, the inspection server 2C allows audit to be conducted by two persons like in the second embodiment. The other points of the inspection server 2C are similar to those of the inspection server 2B according to the third embodiment.

The main controller 11A stores a first private key (MAC generation key) and a second private key (MAC generation key). The IC card 7B used by the verifier stores a first public key (MAC generation key) paired with the first private key. The IC card 7B used by the auditor stores a second public key (MAC generation key) paired with the second private key.

Steps ST11C to ST14C of the procedure for audit processing according to the fourth embodiment shown in FIG. 11 are similar to steps ST11B to ST14B of the procedure for audit processing according to the third embodiment shown in FIG. 9. Accordingly, the procedure for audit processing will be described from steps ST15C1 and ST15C2.

For verifier's audit processing, the inspection server 2C reads the first public key from the verifier's IC card 7B inserted into the IC card reader/writer 22 (step ST15C1). Thus, the transmitting unit 73 of the IC card 7B transmits the first public key to the inspection server 2C.

The inspection server 2C causes the computing unit 71B to perform arithmetic computation to obtain count information, etc., from the first MAC received from the main controller 11A, using the first public key received from the verifier's IC card 7B. The inspection server 2C compares the count information, etc., obtained from the first MAC by the computing unit 71B and the count information, etc., received in unencrypted state from the main controller 11A (step ST16C1).

Like in step ST17B according to the third embodiment, the inspection server 2C outputs a result of the audit based upon a result of the comparison (step ST17C).

For auditor's audit processing, the inspection server 2C reads the second public key from the auditor's IC card 7B inserted into the IC card reader/writer 22 (step ST15C2). Thus, the transmitting unit 73 of the IC card 7B transmits the second public key to the inspection server 2C.

The inspection server 2C causes the computing unit 71B to perform arithmetic computation to obtain count information, etc., from the second MAC received from the main controller 11A, using the second public key received from the auditor's IC card 7B. The inspection server 2C compares the count information, etc., obtained from the second MAC by the computing unit 71B and the count information, etc., received in unencrypted state from the main controller 11A (step ST16C2).

Like in the verifier's audit processing, the inspection server 2C outputs a result of the audit based upon a result of the comparison (step ST17C).

It has been described that the inspection server 2C performs audit processing. The customer's server 3 is also configured to perform the audit processing.

According to the fourth embodiment, since two MACs as well as count information are obtained using two pairs of MAC generation keys, the advantages similar to those of the second embodiment can be brought about in addition to those of the third embodiment.

While certain embodiments have been described, these embodiments have been presented by way of example only, and are not intended to limit the scope of the inventions. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for auditing shredding data including first count information which includes the number of processed paper sheets in a system for auditing shredding data, including a paper sheet processing apparatus which inspects paper sheets and classifies the paper sheets based on a result of inspection of the paper sheets, the audit method comprising:
   causing the paper sheet processing apparatus to generate a first message authentication code based on the first count information using a first message authentication code generation key;
   causing the paper sheet processing apparatus to transmit the first count information and the first message authentication code to a first computing unit which performs arithmetic computation for an audit;
   causing the first computing unit to obtain second count information based on the first message authentication code using a second message authentication code generation key stored in a first integrated circuit card and paired with the first message authentication code generation key;
   causing the first computing unit to compare the first count information and the second count information; and
   determining an audit result as normality when the first count information and the second count information compared by the first computing unit coincide with each other, and determining the audit result as abnormality when the first count information and the second count information compared by the first computing unit do not coincide with each other.

2. The method of claim 1, wherein the first count information includes the number of shredded paper sheets.

3. The method of claim 1, wherein the first computing unit is provided in the first integrated circuit card.

4. The method of claim 1, wherein the first computing unit is provided in a management computer which manages the first count information.

5. The method of claim 1, further comprising:
   causing the paper sheet processing apparatus to generate a second message authentication code based on the first count information using a third message authentication code generation key;
   causing the paper sheet processing apparatus to transmit the first count information and the second message authentication code to a second computing unit which performs arithmetic computation for audit;
   causing the second computing unit to obtain third count information based on the second message authentication code using a fourth message authentication code generation key stored in a second integrated circuit card and paired with the third message authentication code generation key;
   causing the second computing unit to compare the first count information and the third count information; and
   determining an audit result as normality when the first count information and the third count information compared by the second computing unit coincide with each other, and determining the audit result as abnormality when the first count information and the third count information compared by the second computing unit do not coincide with each other.

6. The method of claim 5, wherein:
   the first computing unit is provided in the first integrated circuit card; and
   the second computing unit is provided in the second integrated circuit card.

7. The method of claim 5, wherein the first computing unit and the second computing unit are provided in a management computer hich manages the first count information.

8. A system for auditing shredding data comprising:
   a paper sheet processing apparatus configured to inspect paper sheets and classify the paper sheets based on a result of inspection of the paper sheets;
   a management computer configured to manage first count information including the number of processed paper sheets;
   a first integrated circuit card used for audit; and
   a first computing unit configured to perform arithmetic computation for audit,
   wherein the paper sheet processing apparatus includes:
      a first message authentication code generation unit configured to generate a first message authentication code based on the first count information using a first message authentication code generation key; and
      a first transmitting unit configured to transmit the first count information and the first message authentication code to the first computing unit,
   wherein the first computing unit includes:
      a first count information computing unit configured to obtain second count information based on the first message authentication code using a second message authentication code generation key stored in the first integrated circuit card and paired with the first message authentication code generation key; and a first comparing unit configured to compare the first count information and the second count information, wherein an audit result is determined as normality when the first count information and the second count information compared by the first comparing unit coincide with each other, and the audit result is determined as abnormality when the first count information and the second count information compared by the first comparing unit do not coincide with each other.

9. The system of claim 8, wherein the first count information includes the number of shredded paper sheets.

10. The system of claim 8, wherein the first computing unit is provided in the first integrated circuit card.

11. The system of claim 8, wherein the first computing unit is provided in the management computer which manages the first count information.

12. The system of claim 8, further comprising:

a second integrated circuit card used for audit; and a second computing unit configured to perform arithmetic computation for audit, wherein the paper sheet processing apparatus includes:

a second message authentication code generation unit configured to generate a second message authentication code based on the first count information using a third message authentication code generation key; and a second transmitting unit configured to transmit the first count information and the second message authentication code to the second computing unit, wherein the second computing unit includes:

a second count information computing unit configured to obtain third count information based upon the second message authentication code using a fourth message authentication code generation key stored in the second integrated circuit card and paired with the third message authentication code generation key; and a second comparing unit configured to compare the first count information and the third count information, wherein an audit result is determined as normality when the first count information and the third count information compared by the second comparing unit coincide with each other, and the audit result is determined as abnormality when the first count information and the third count information compared by the second comparing unit do not coincide with each other.

13. The system of claim 12, wherein:

the first computing unit is provided in the first integrated circuit card; and the second computing unit is provided in the second integrated circuit card.

14. The system of claim 12, wherein the first computing unit and the second computing unit are provided in the management computer which manages the first count information.

* * * * *